May 4, 1926.
G. S. LEDDICK
ELECTRIC SWITCH
Original Filed Jan. 2, 1923
1,583,598
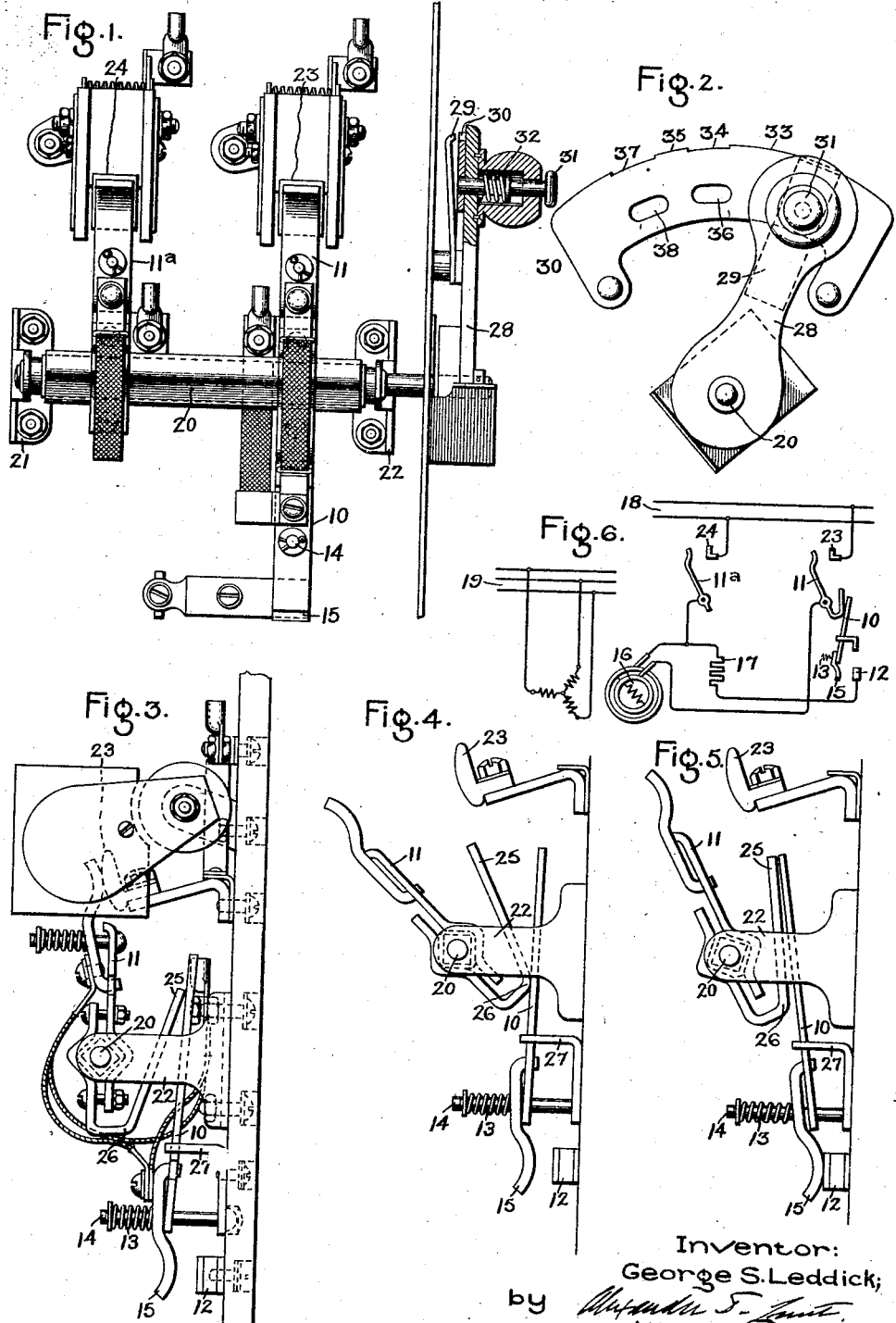
Inventor:
George S. Leddick;
by
His Attorney.

Patented May 4, 1926.

1,583,598

UNITED STATES PATENT OFFICE.

GEORGE S. LEDDICK, OF SCHENECTADY, NEW YORK, ASSIGNOR TO GENERAL ELECTRIC COMPANY, A CORPORATION OF NEW YORK.

ELECTRIC SWITCH.

Original application filed January 2, 1923, Serial No. 610,097. Divided and this application filed September 26, 1924. Serial No. 740,112.

*To all whom it may concern:*

Be it known that I, GEORGE S. LEDDICK, a citizen of the United States, residing at Schenectady, county of Schenectady, State of New York, have invented certain new and useful Improvements in Electric Switches, of which the following is a description.

The present application is a division of my prior application, Serial No. 610,097, filed January 2, 1923.

One of the objects of the invention is the provision of a simple and effective device for limiting the speed of operation of a switch shaft.

A further object of the invention is to provide an improved latching arrangement for holding a plurality of switch members in either of a plurality of predetermined relative positions and for limiting the speed of operation of the switch members.

These, and other objects of the invention as will be either explained fully hereinafter or as will be apparent to those skilled in the art, are attained in the electric switch which is shown on the accompanying drawing in which Fig. 1 shows a plan view of the complete switch; Fig. 2 is a detail showing the latching or speed limiting arrangement; Figs. 3, 4 and 5 are simplified details showing the various relative positions of the relatively movable switch members of the switch and the interlocking arrangement between the switch members; and Fig. 6 is a simplified diagram of a control system in which the switch of the invention is used in the control of the field circuit of a synchronous motor.

Referring to the drawings, the electric switch comprises a switch member 10 and a pair of relatively movable switch members 11 and 11ᵃ which are interlocked with the switch member 10 so as to control the operation of the switch member 10. As shown in Figs. 3, 4 and 5, the switch member 10 is biased to the closed position; that is, in engagement with the stationary contact 12 by means of the coiled spring 13 which surrounds a post 14 which passes through the switch member 10 and the contact tip 15 thereof. The switch member 10 and the set of switch members 11 and 11ᵃ are arranged to control separate circuits, and by an inspection of Fig. 6 it will be seen that the switch member 10 when in the closed position connects the field winding 16 of a synchronous motor in a local circuit which includes the resistor 17 so that the synchronous motor may be started as an induction motor until the speed thereof has increased to substantial synchronism. When the switch members 11 and 11ᵃ are closed and the switch member 10 opened, the field winding of the synchronous motor is connected to the direct current supply circuit 18 so that the speed of the motor will be brought into synchronism with the alternating supply circuit 19 and the motor will operate as a synchronous motor. This is only one of the uses of my invention, and I can conceive that the invention may be applied to other uses in which it is desirable that the sequence of operation of a plurality of relatively movable switch members shall proceed in a definite order.

The switch members 11 and 11ᵃ are mounted upon the shaft 20 which is mounted in the bearings 21 and 22, so that these switch members are pivotally supported for movement to and from their respective stationary switch contacts 23 and 24. By reference to Figs. 3, 4 and 5, it will be noted that there is an interlocking connection between the switch member 11 and the switch member 10 so that the switch member 10 is controlled in its movement by the switch member 11. In Fig. 4 the two switch members are shown in their relative positions when both switch members are in their respective open position. It will be seen that the bent strip 25, which is secured to the shaft 20 and also to the switch member 11, is in effect an extension of the switch member 11 and serves as a cam interlocking connection between the switch members 11 and 10. With the switch member 11 in the full open position, the upper end of the switch member 10 is engaged by the extension 25 at the apex 26 of the angle so that the switch member 10 is held in the open position against the bias of the spring 13 which tends to close the same. When the switch member 11 is moved clockwise about its pivotal supports a limited distance as shown in Fig. 5, the upper end of the switch member 10 is permitted to move counter-clockwise by reason of the action of the spring 13 so that the switch contact 15 will make engagement with the stationary contact 12 and connect the synchronous motor field in a local circuit including the resistor 17 (Figs. 5 and 6). If the clockwise movement of the switch member 11 is continued, the upper end of the extension 25 will engage the upper end of the switch member 10 and will move the switch member 10 to the open position against the action of the spring 13 until this opening movement is arrested by the stop 27. The switch member 11 will make engagement with its stationary contact 23 as shown in Fig. 3, thereby connecting the field of the synchronous motor to the said direct current source of supply 18. It will be observed from the foregoing description that a continuous movement of the switch member 11 imparts one relative movement to the switch members and then imparts a different relative movement; that is, moving the switch member 11 toward the closed position first permits the switch member 10 to move to the closed position and then opens the switch member 10 before the switch member 11 is moved to the closed position. It will also be observed that in opening the switch, a continuous movement of the switch member 11 in the opening direction first imparts one relative movement to the switch members and then a different relative movement; that is, in moving the switch member 11 from the closed position as shown in Fig. 3 towards the full open position as shown in Fig. 4, at an intermediate position the switch member 10 will be permitted to close as shown in Fig. 5, and will be again returned to the open position when the switch member 11 has reached the full open position as shown in Fig. 4. This has an advantage in that, for example, when the switch is used for controlling the field of a synchronous motor as shown in Fig. 6, when the motor field is disconnected from the supply circuit it is connected in a local circuit so as to reduce the current in the field circuit preparatory to finally opening the motor field circuit. The above described interlocking arrangement, whereby operating a common actuating means for a plurality of switch members in one direction first imparts one relative movement to the switch members and then imparts a different relative movement to the switch members, is claimed in my prior application, Serial No. 610,097, filed January 2, 1923, of which the present application is a division.

For certain applications as, for example, in the control of the field circuit of a synchronous motor as shown in Fig. 6, it is desirable that the speed of operation of the switch members be limited, and for that purpose I have provided the latching arrangement shown in Figs. 1 and 2 which I shall now describe. I would have it understood that this latching arrangement is not limited in its application to the particular arrangement of relatively movable switch members which I have previously described, but that this feature of my invention is applicable generally where it is desired to limit the speed of operation of a switch shaft.

Referring to Figs. 1 and 2, the handle 28 which is connected with the shaft 20 provides a common actuating means for the switch members previously described. A latching arrangement is provided whereby this handle is held in any one of a plurality of predetermined positions and the speed of operation of this handle thus limited. The spring pressed detent 29 provides a locking member which is carried by and moves with the handle 28 and this detent cooperates with the stationary dial plate 30, which may be mounted on the casing of the switch, for holding the handle 28 in any one of a plurality of predetermined positions and for limiting the speed of operation of the handle. This detent 29 is an integral extending part of a leaf spring having one end thereof secured to the handle 28 as indicated. In the upper end of the handle there is provided an operating member for the detent 29. This member takes the form of a resiliently mounted push button 31 which is normally biased out of engagement with the dial plate 30 by means of the spring 32, but when this button is depressed as shown in Fig. 1, the left-hand end thereof engages the resilient detent 29 and moves the same out of engagement with the notched upper edge of the dial plate 30.

The operation of this part of my invention is as follows: In Fig. 2 the handle of the switch is shown as in the running position. In order to move the handle to the open position it is necessary to first press the button 31 so as to release the detent 29 from engagement with the notch in the upper edge of the dial plate 30. The handle may then be moved counter-clockwise until the left-hand edge of the detent 29 slides under the portion 33 of the dial plate 30. Further movement of the handle in the counter-clockwise direction is arrested because of the fact that the pin of the push button 31 is arrested at the left-hand edge of the slot in the dial plate 30. The push button must now be released to permit the handle to be moved until the detent 29 drops into the notch 34 thus arresting any further movement of the handle in this direction. The relative positions of the switch members will now be as shown in Fig. 5. In order to continue the counter-clockwise movement of the handle, it will be necessary to press the push button 31 again so as to thereby permit the detent 29 to slide under the portion 35 of the dial plate, and by moving the handle a short distance counter-clockwise, the detent will be engaged under the portion 35. However, further movement of the handle is arrested until the push button 31 is released because of the fact that the end of the pin connected with the push button will engage the left-hand edge of the slot 36. When the push button has been released, the handle may be moved a short distance counter-clockwise until the detent 29 drops into the notch 37. Further movement of the handle counter-clockwise is thereby prevented. The relative positions of the switch members will now be as shown in Fig. 4.

In order to close the switch member 11, it will be necessary to press the push button 31, move the handle 28 a short distance clockwise until the pin associated with the push button 31 engages with the right-hand edge of the slot 38, then release the push button out of engagement with the slot 38 so that the handle may be moved to the middle operative position at which the detent 29 will arrest further movement. In order to move from the middle position to the final position, that shown in Fig. 2, it will be necessary to again press the push button 31, move the handle 28 to a short distance clockwise until the detent 29 engages under the portion 33 of the dial plate, then release the push button and finally move the handle to the position shown in Fig. 2.

It will be observed that a definite sequence of operations must be had in order to move the handle from one definite position to another definite position, and that this sequence of operations will limit the permissible speed of operation of the handle so as to thereby prevent the handle from being thrown directly from one extreme position to the other. It will also be observed that the latching arrangement serves to positively hold the handle in any one of the predetermined definite positions of the handle so that there is no possibility of unintentional operation of the switch members. It will also be observed that the means disclosed herein for moving the shaft from one position to another is a very simple, compact, and economical construction which will not easily get out of order or need any considerable repair. These advantages are due essentially to the use of a leaf spring attached at one end to the handle 28, with a portion thereof extending to constitute the detent 29, and to the arrangement of this spring and the handle 28 so that they slide together over the opposite sides of the notched and perforated plate 30, and to the location of this spring opposite the push button 31. This structure is in itself very simple and compact and moreover permits the pin of the push button 31 to act directly on the leaf spring and cooperate directly with the plate 30, thus dispensing with intervening additional space-consuming parts heretofore used in devices of this kind.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:

An electric switch comprising a shaft, switching mechanism located on said shaft, a handle attached to said shaft for operation thereof, a hand knob on said handle, a plate over the face of which the end of the handle slides, a leaf spring mounted on said handle and slidable over the back of said plate and extending opposite to said knob, the said plate having notches and holes corresponding to the notches, an extension from said spring adapted to successively engage said notches, a pin extending through said knob and movable through said holes and into engagement with the leaf spring to disengage said spring from said notches, the size and location of each hole with respect to the pin and corresponding notch being such as to permit the pin to hold the spring disengaged from a notch until the handle is moved beyond the point where the spring can engage said notch and to prevent the movement of the handle to a point where the spring can engage another notch without the withdrawal of the pin from said hole.

In witness whereof, I have hereunto set my hand this 25th day of September, 1924.

GEORGE S. LEDDICK.